United States Patent
Brokes et al.

(10) Patent No.: US 10,197,075 B2
(45) Date of Patent: Feb. 5, 2019

(54) TURN DRIVE FOR A WIND TURBINE, AND METHOD FOR ROTATING THE ROTOR SHAFT OF A WIND TURBINE

(71) Applicant: Senvion SE, Hamburg (DE)

(72) Inventors: Michael Brokes, Bremen (DE); Ulf Edelmann, Fockbek (DE); Carsten Eusterbarkey, Simonsberg (DE); Sven Lehmann, Fockbek (DE)

(73) Assignee: Senvion SE, Hamburg (DE)

(*) Notice: Subject to any disclaimer, the term of this patent is extended or adjusted under 35 U.S.C. 154(b) by 646 days.

(21) Appl. No.: 14/650,944

(22) PCT Filed: Dec. 5, 2013

(86) PCT No.: PCT/EP2013/075734
§ 371 (c)(1),
(2) Date: Jun. 10, 2015

(87) PCT Pub. No.: WO2014/090690
PCT Pub. Date: Jun. 19, 2014

(65) Prior Publication Data
US 2015/0308467 A1    Oct. 29, 2015

(30) Foreign Application Priority Data
Dec. 10, 2012  (DE) ............. 10 2012 222 637

(51) Int. Cl.
*F16D 31/02* (2006.01)
*F15B 15/18* (2006.01)
(Continued)

(52) U.S. Cl.
CPC .............. *F15B 15/18* (2013.01); *F03D 13/10* (2016.05); *F15B 15/02* (2013.01); *F15B 15/262* (2013.01); *Y02E 10/72* (2013.01)

(58) Field of Classification Search
CPC .......... F15B 2015/268; F16H 61/4052; F16H 61/456; F16H 2061/6608
(Continued)

(56) References Cited

U.S. PATENT DOCUMENTS 4,324,098 A * 4/1982 Aruga .................. F16H 61/456
                                                          60/464
6,254,197 B1 * 7/2001 Lading ................... B60T 13/22
                                                          303/15
(Continued)

FOREIGN PATENT DOCUMENTS

AU      2010268928 B2    1/2011
EP         1389686 B1    6/2005
(Continued)

OTHER PUBLICATIONS

International Search Report dated Feb. 20, 2014 (PCT/EP2013/075734).

*Primary Examiner* — Michael Leslie
(74) *Attorney, Agent, or Firm* — Alix, Yale & Ristas, LLP

(57) ABSTRACT

The invention relates to a turn drive for a wind turbine. The turn drive comprises a shaft, a hydraulic motor for driving the shaft, and a drive line for supplying a pressurized hydraulic fluid to the hydraulic motor. According to the invention, the drive line is provided with a settable pressure-limiting valve. The invention additionally relates to an associated method for rotating the rotor shaft of the wind turbine. By means of the method according to the invention and the turn drive, the rotor blades can be mounted individually on the hub of the rotor, without the gearbox of the wind turbine becoming overloaded.

16 Claims, 8 Drawing Sheets

(51) Int. Cl.
   *F15B 15/02*     (2006.01)
   *F15B 15/26*     (2006.01)
   *F03D 13/10*     (2016.01)

(58) Field of Classification Search
   USPC ........................................................ 60/435
   See application file for complete search history.

(56) References Cited

U.S. PATENT DOCUMENTS

| | | | | |
|---|---|---|---|---|
| 6,564,549 | B2* | 5/2003 | Nagura | F16H 61/4157 |
| | | | | 60/445 |
| 8,333,069 | B2* | 12/2012 | Heren | F16H 61/4052 |
| | | | | 60/468 |
| 8,450,871 | B2 | 5/2013 | Trede | |
| 2010/0043423 | A1* | 2/2010 | Heren | F16H 61/4052 |
| | | | | 60/484 |
| 2010/0056315 | A1* | 3/2010 | Scholte-Wassink | F16N 7/38 |
| | | | | 475/159 |
| 2011/0027061 | A1 | 2/2011 | Noack | |

FOREIGN PATENT DOCUMENTS

| | | | |
|---|---|---|---|
| EP | 2072814 | A2 | 6/2009 |
| EP | 2159472 | A1 | 3/2010 |

* cited by examiner

Fig. 1A    Fig. 1B

TURN DRIVE FOR A WIND TURBINE, AND METHOD FOR ROTATING THE ROTOR SHAFT OF A WIND TURBINE

The invention relates to a turn drive for a wind turbine. The turn drive comprises a shaft, a hydraulic motor for driving the shaft, and a drive line for supplying a pressurized hydraulic fluid to the hydraulic motor. The invention additionally relates to a method for rotating the rotor shaft of a wind turbine.

BACKGROUND

In the erection of wind turbines, the nacelle is usually first mounted on a tower, and the rotor is then connected to the nacelle. If the rotor blades are mounted individually on the hub of the rotor, the procedure is normally such that the hub of the rotor is rotated into a predefined angular position, such that the rotor blade can be brought to the hub from a predefined direction. For the mounting of the subsequent rotor blade, the hub is rotated such that the subsequent rotor blade can be brought to the hub from the same direction. If, for example, the rotor has three rotor blades, the hub is rotated by 120° between the mounting of two rotor blades.

In the intermediate stage, in which only some of the rotor blades have been attached to the hub, the rotor is highly unbalanced. Consequently, a large torque is required to change the angular position of the rotor. A device that acts directly upon the rotor shaft in order to apply this torque is described, for example, in EP 1 659 286.

If a gearbox is provided between the rotor and the generator of the wind turbine, the gear ratio of the gearbox can be used to reduce the torque to be applied. For this purpose, a turn drive is connected to the high-speed shaft of the gearbox. The torque of the turn drive acting upon the high-speed gear shaft increases according to the gear ratio of the gearbox, such that the turn drive only has to apply a comparatively small torque in order to rotate the rotor, despite the unbalance. Devices that act upon the high-speed gear shaft in order to rotate the gearbox are described, for example, in EP 1 167 754, EP 2 116 722 and DE 103 34 448.

In the case of this procedure, there arises the problem that, via the gearbox, a torque is transmitted that is close to the load limits of the gearbox. If further forces are added, for example as a result of a gust, the load limits may be exceeded. Overloading of the gearbox is to be avoided, however, in order that the gearbox does not sustain damage even before the wind turbine is put into operation for the first time.

The invention is based on the object of presenting a turn drive and a method for rotating the rotor shaft of a wind turbine that avoid overloading of the gearbox. Proceeding from the prior art, the object is achieved with the features of the independent claims. Advantageous embodiments are given in the dependent claims.

SUMMARY

According to the invention, in the case of the turn drive, the drive line is provided with a settable pressure-limiting valve. The pressure at which the pressure-limiting valve opens can be varied by setting of the pressure-limiting valve. By means of the pressure-limiting valve, the torque that can be transmitted to the gearbox is limited.

For the purpose of driving the hydraulic motor, a hydraulic fluid is routed through the drive line, into the hydraulic motor. The torque with which the shaft is driven is substantially proportional to the pressure with which the hydraulic fluid enters the hydraulic motor. The pressure-limiting valve according to the invention has the effect that the pressure in the drive line cannot exceed a predefined threshold value. If the threshold value is exceeded, the pressure-limiting valve opens and some of the hydraulic fluid is drawn off by the pressure-limiting valve. With the limitation of the pressure, the torque acting upon the shaft is also limited, such that overloading of the gearbox connected to the shaft is precluded. The pressure at which the pressure-limiting valve opens is preferably selected such that the pressure is limited to a value that corresponds to the maximum torque with which the gearbox may be loaded. If the torque of the rotor is greater than the torque threshold at which the pressure-limiting valve opens, the turn drive cannot rotate the rotor further. This is accepted, and has the consequence that, for example during a gust, the rotor stands still or even rotates in the opposite direction. After the end of the gust, the torque of the turn drive is again sufficient to rotate the rotor, and the rotor begins to move again in the respective direction. Since the pressure-limiting valve is realized so as to be settable, the turn drive is easily adapted, e.g. to differing rotor blades and/or differing ambient conditions.

The term line is not to be understood, as a limitation, in a structural sense. The invention thus also includes, for example, a pressure-limiting valve that is disposed in the housing of the hydraulic motor and connected there to the hydraulic fluid channel. Usually, hydraulic motors are supplied by means of one drive line for each direction of rotation. Preferably, a pressure-limiting valve is provided in each drive line, such that the torque threshold value is maintained in both directions of rotation. An individual drive line may also be equipped with a plurality of pressure-limiting valves. This has the advantage that the torque that can be transmitted is still limited even if one of the pressure-limiting valves is defective. If the turn drive comprises a plurality of drive lines, each of the drive lines may be equipped with a plurality of pressure-limiting valves.

The output of the hydraulic motor depends on how much hydraulic fluid is supplied to the hydraulic motor through the drive line. A valve may be disposed in the drive line in order to set the flow of the hydraulic fluid through the drive line. Preferably, this is a proportional valve that allows a continuous transition between an open position and a closed position. The turn drive may comprise a controller that is designed to set the pressure-limiting valve in an appropriate manner.

Owing to leakage flow, a hydraulic motor is generally not suitable for locking the rotor in a particular position. In order that the rotor can nevertheless be locked, the turn drive is preferably equipped with a mechanical brake for the shaft. This brake may be a multi-disk brake, by means of which a friction can be generated between a first part, which rotates with the shaft, and a second part, which does not rotate with the shaft. The multi-disk brake may be equipped with wet-running, oil-cooled disks. The multi-disk brake can be brought into engagement by a movement of the shaft in the axial direction.

A hydraulic actuating element may be provided to actuate the brake. A brake line may be provided, which is connected to the hydraulic actuating element, and by means of which hydraulic fluid is supplied to the actuating element. In order that the brake is not released in an uncontrolled manner in the event of a failure of the hydraulic unit, the brake is preferably set up such that it is unpressurized when in engagement. The brake is released in that the hydraulic fluid is pressurized in the actuating element.

Even when the shaft is locked by the brake, there are to be no excess loads acting upon the gearbox. The brake can therefore be set to a predefined slip moment. The slip moment of the brake preferably corresponds to the torque threshold value at which the pressure-limiting valve in the drive line opens. There is then a uniform maximum torque that is exerted upon the high-speed gear shaft by the hydraulic motor or the brake. For the purpose of setting the slip moment, there may be a pressure reducer disposed in the brake line. By means of the pressure reducer, the pressure in the actuating element can be kept to a constant value, even if the pressure delivered by the hydraulic unit changes.

If the hydraulic motor and the brake act simultaneously upon the shaft, there is the risk that the total torque is greater than is allowable for the gearbox. In an advantageous embodiment, the hydraulic motor and the brake are therefore coupled to each other, such that torque exerted jointly upon the shaft does not exceed a predefined threshold value. The predefined threshold value may correspond to the maximum torque that may be exerted upon the shaft by the hydraulic motor or the brake individually.

For the coupling between the brake and the hydraulic motor, a connecting line may be provided, which extends between the hydraulic motor and the brake. The connecting line may thus be coupled to the brake line, such that the higher of the two pressures acts upon the actuating element of the brake. For example, the connecting line and the brake line may be connected to each other via a shuttle valve. The higher pressure, present in the drive line when the hydraulic motor is in operation, is then transferred automatically to the actuating element of the brake, and has the result of releasing the brake. The torque from the brake and the torque of the hydraulic motor thus cannot be added together.

If the rotor exerts upon the turn drive a torque that is greater than the threshold value, the brake begins to slip. The brake can only withstand this state for a short period of time without sustaining damage. An auxiliary brake line is therefore provided, via which hydraulic fluid can be supplied to the actuating element, bypassing the settable pressure reducer. Via the auxiliary brake line, the actuating element can be pressurized and the brake can thereby be released, after the brake has slipped over a predefined period of time. However, it is not desirable for the turn drive to follow a rotation of the rotor without resistance. Preferably, therefore, simultaneously with the release of the brake, the proportional valve in the drive line is opened, such that the hydraulic motor applies an opposing torque to the rotor. The proportional valve is preferably set such that the torque of the hydraulic motor corresponds to the torque threshold value. The turn drive may comprise a controller, which causes a valve in the auxiliary brake line to act appropriately in combination with the proportional valve.

Before a high torque is applied by means of the turn drive according to the invention, the gears should be turned without load for a predefined period of time, in a gearbox preparation phase. The pumps by which the gear oil is circulated can be in operation during the gearbox preparation time, such that the gear oil is kept in motion and heats up.

In the gearbox preparation phase, the turn drive, which is already connected to the high-speed gear shaft, should run concomitantly, without load. For this purpose, the hydraulic motor may be provided with a short-circuited line, such that the hydraulic motor can circulate the hydraulic fluid without greater resistance. In parallel, the actuating element of the brake can be pressurized via the auxiliary brake line, such that the brake is open.

For the purpose of checking that the torque exerted upon the gearbox actually remains below the predefined torque threshold value, the torque acting between the drive unit of the turn drive and the structure of the wind turbine may be measured. This torque corresponds to the torque that is transmitted by the turn drive to the high-speed gear shaft. A torque sensor may be provided, to directly measure the torque between the turn drive and the structure of the wind turbine. In an advantageous embodiment, the turn drive comprises a support, via which the turn drive is connected to the structure of the wind turbine, and the torque exerted upon the support is measured. In an advantageous embodiment, the support of the turn drive is designed to be connected to the brake consoles of the holding brake of the high-speed gear shaft. The support may comprise a plurality of struts suspended in a jointed manner. The jointed suspension enables transverse forces to be avoided, if the drive unit is not aligned exactly centrally in relation to the high-speed gear shaft. The drive unit denotes the part of the turn drive that comprises the hydraulic motor and/or the brake.

The turn drive may comprise a pressure accumulator, such that the pressure of the hydraulic fluid can be maintained for a predefined period of time even if the hydraulic unit fails. The pressure accumulator may act upon the brake line and/or upon the auxiliary brake line.

The torque threshold value to which the turn drive is set may be, for example, between 30 kNm and 100 kNm, preferably between 50 kNm and 70 kNm. The pressure at which the pressure-limiting valve opens may be, for example, between 100 bar and 400 bar. The pressure for complete opening of the brake may be, for example, between 10 bar and 30 bar. The pressure with which the brake is set to a slip moment corresponding to the torque threshold value may be, for example, between 5 bar and 15 bar.

When the hub of the rotor has been brought into the correct angular position for mounting the rotor blade, the rotor shaft is preferably locked in a fixed manner. For this purpose, a locking device may be provided, which fixes the rotor shaft relative to the structure of the wind turbine. In order to release the locking device again after the rotor blade has been mounted, the locking device is first brought into a no-load position. For this purpose, the rotor shaft is rotated against the load, by means of the turn drive, until the locking device is free. The locking device can then be released, such that the rotor shaft is again freely rotatable.

In this phase, the turn drive may be operated by hand, in that an operator observes the locking device and puts the turn drive into operation accordingly. In an advantageous embodiment, the turn drive is designed such that this operation is performed automatically. For this purpose, the turn drive may have a signal input, via which information relating to the state of the locking device can be supplied to the turn drive. The controller of the turn drive may be designed such that it puts the hydraulic motor into operation against the load of the locking device until, via the signal input, it receives the information that the locking device is free of load. The hydraulic motor is then stopped, and the brake is set to the predefined slip moment, such that the locking device can be released.

The invention additionally relates to a system composed of a turn drive and a locking device for the rotor shaft, the locking device being designed for automatic actuation. The locking device may thus be released and brought into engagement by means of, for example, a signal from a controller. In this way, it is possible for the rotor positions to be approached in a fully automatic manner. If it is assumed that, in the initial state, the locking device is in engagement, the method comprises the following steps. Firstly, the hydraulic motor is put into operation, such that the locking device is relieved of load. With the locking device in the non-loaded state, the multi-disk brake is brought into engagement. The locking device is then released, this preferably being initiated by a control signal. The hydraulic motor is again put into operation, in order to approach the next rotor position. Once the desired rotor position has been reached, the multi-disk brake is brought into engagement again. The locking device is brought into engagement. Finally, the multi-disk brake is released and the turn drive is relieved of load. In this state, the next rotor blade can be mounted. Preferably, during this sequence, the hydraulic motor, the multi-disk brake and the locking device are under the control of a common control unit.

It is desirable that, in the mounting of the individual rotor blades, not only are the prescribed torque limits actually adhered to, but that there is also corresponding documentation. Such documentation is useful in order that, upon the hand-over of the wind turbine, assurances can be given in respect of the perfect state of the gearbox. The turn drive may therefore comprise a data logger, which records information from which it is possible to deduce the loads to which the gearbox was subjected during the mounting operation. This information may include, for example, the pressure of the hydraulic fluid in the hydraulic motor, the torque between the hydraulic motor and the structure of the wind turbine, the oil temperature of the gearbox of the wind turbine, the wind speed and wind direction, and/or the angular position of the low-speed shaft of the gearbox of the wind turbine. Preferably, the turn drive is equipped with corresponding sensors, or with signal inputs for information from external sensors. The data logger should record the respective data at least when the turn drive is in operation and the locking device of the rotor shaft has been released. For complete documentation, the recording of the data may also be continued in the phases in which the rotor shaft has been locked by means of the locking device.

The invention additionally relates to an arrangement composed of such a turn drive, or system, and a gearbox of a wind turbine, the shaft of the turn drive being in engagement with the high-speed gear shaft. Preferably, the shaft of the turn drive is aligned concentrically in relation to the high-speed shaft of the gearbox.

The invention additionally relates to a method for rotating a rotor shaft of a wind turbine that is connected to a gearbox. In the method, the turn drive is connected to the high-speed gear shaft, the turn drive being equipped with a hydraulic motor. A pressure-limiting valve in a drive line of the hydraulic motor is set to a predefined threshold value, in order to limit the torque that can be transmitted to the gearbox. A pressurized hydraulic fluid is supplied to the hydraulic motor, the pressure-limiting valve opening when the pressure of the hydraulic fluid exceeds the predefined threshold value. The method may be enhanced with further features, which are described in connection with the turn drive according to the invention.

BRIEF DESCRIPTION OF THE DRAWINGS

The invention is explained exemplarily in the following with reference to the appended drawings, on the basis of advantageous embodiments. There are shown in.

DETAILED DESCRIPTION

A wind turbine shown in FIG. 1 has a rotor, which has three rotor blades 14. When the wind turbine is being erected, the rotor blades 14 are connected in succession to the hub 15 of the rotor. For the purpose of mounting the first rotor blade 14, the hub 15 is rotated such that the flange for the rotor blade 14 points to the left (9-o'clock position), as viewed from the direction of the nacelle. Then, as shown in FIG. 1A, the rotor blade 14 is brought horizontally to the flange and connected to the flange by means of a plurality of screws.

Figure 1C:
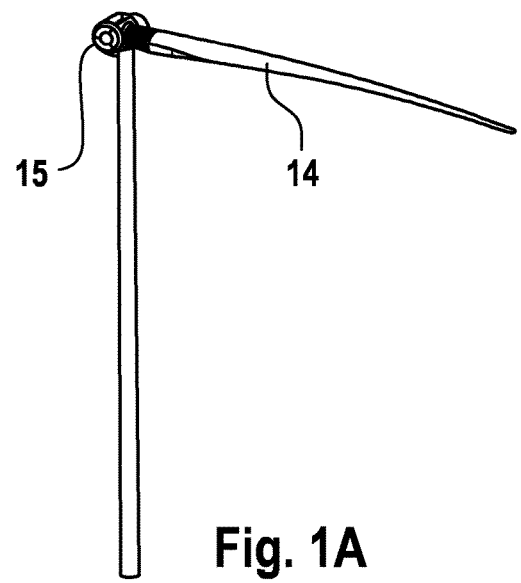
FIG. 1: various stages (A to E) in the individual mounting of the rotor blades.
Figure 1C:
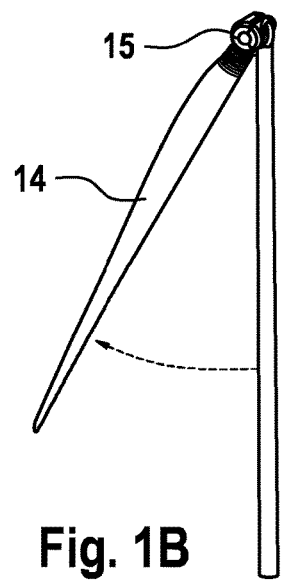
Figure 1C:
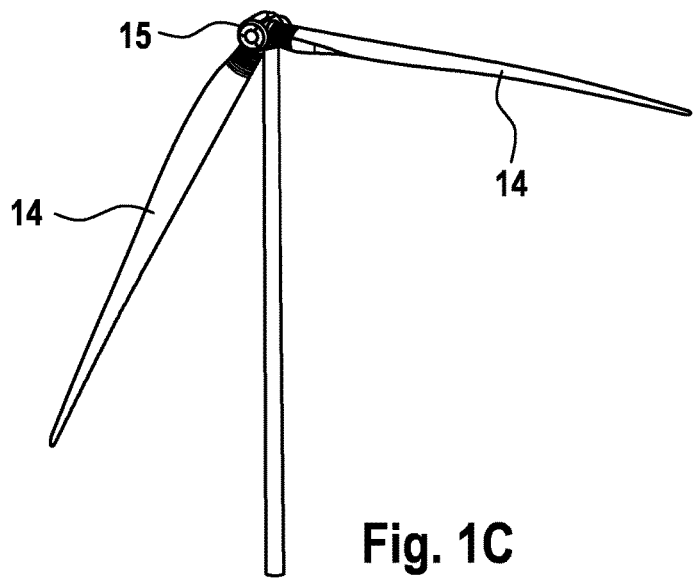
Figure 1E:
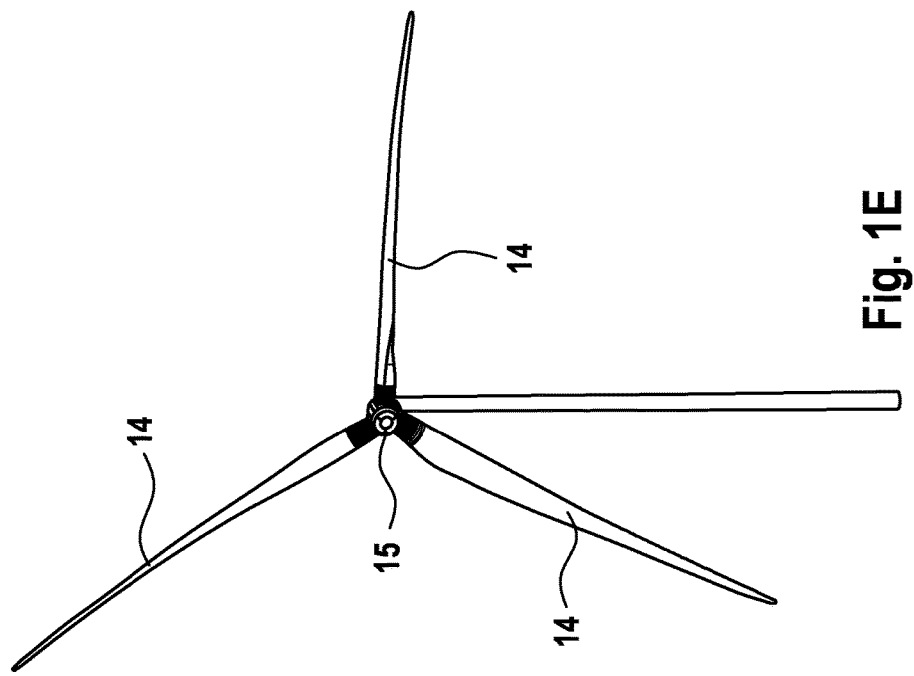
Figure 1D:
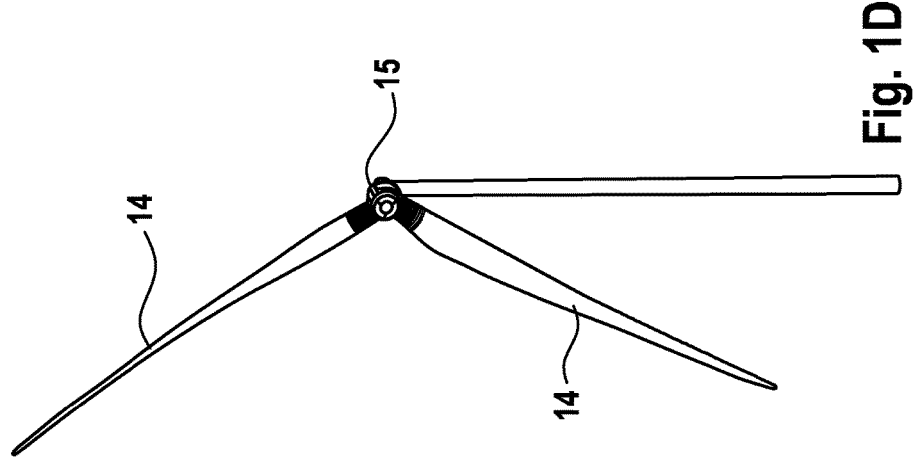

In the next step, the partial rotor 14, 15 is rotated by 120°, such that the next flange assumes the 9-o'clock position, see FIG. 1B. The second rotor blade 14 is brought horizontally to the flange, and connected to the flange by means of a plurality of screws, see FIG. 1C. After a further rotation of the partial rotor 14, 15 by 120°, the third flange assumes the 9-o'clock position, as shown in FIG. 1D. Following the connection of the third rotor blade 14 to the flange, the rotor is complete, see FIG. 1E.

When only some of the rotor blades 14 have been connected to the hub 15, there is a considerable torque acting upon the rotor. This is composed of a static torque, which results from the weight of the rotor blades 14, and a dynamic component, which results from the forces acting upon the rotor blades 14. These forces are, in particular, the wind forces acting upon the rotor blades 14.

Figure 2:
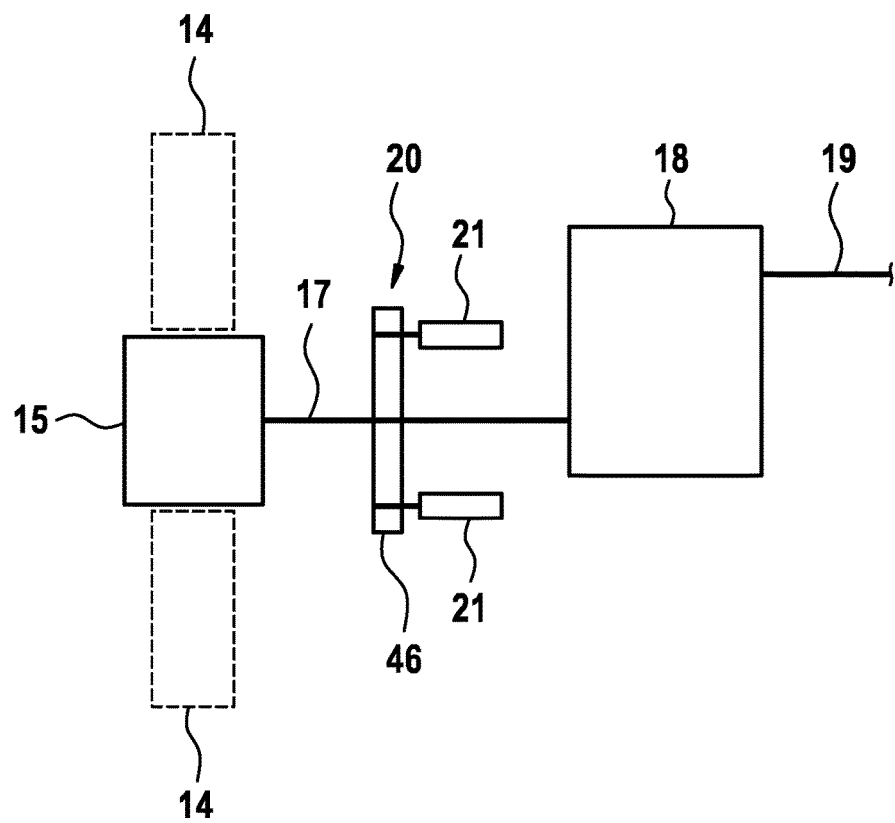
FIG. 2: a schematic representation of a drive train of a wind turbine.

According to FIG. 2, it is provided that the rotor 14, 15 be connected to a generator, not represented, via a gearbox 18. The shaft 17 that extends from the rotor 14, 15 as far as the gearbox 18 is at the same time the rotor shaft and the low-speed gear shaft. The high-speed gear shaft 19 extends from the gearbox 18 in the direction of the generator, not represented.

The turn drive according to the invention is connected to the high-speed gear shaft 19. The turn drive rotates the high-speed gear shaft 19, resulting in a rotation of the rotor shaft 17, which is slower, according to the gear ratio. The high-speed gear shaft 19 in this case may rotate, for example, at a rotational speed of approximately 2 rpm. The rotation of the rotor shaft 17 by 120° then takes approximately 15 minutes.

Once the rotor shaft 17 has been brought into the appropriate angular position for mounting a rotor blade 14, the rotor shaft is mechanically fixed, relative to the structure of the wind turbine, by means of a locking device 20. The locking device 20 comprises a disk 46, which is fixedly connected to the rotor shaft 17. Realized in the disk 46 are a plurality of openings, in which pins 21, which are fixedly connected to the structure of the wind turbine, can engage. When the pins 21 have entered the openings, the rotor shaft 17 is in a locked state, and the entire torque exerted by the rotor 14, 15 is diverted into the structure of the wind turbine. Once the pins 21 have been removed from the openings, the rotor shaft 17 can rotate freely, and the entire torque of the rotor 14, 15 is transmitted to the gearbox 18.

The gearbox 18 is designed such that it can withstand the sum of the static and dynamic torque of the rotor 14, 15, up to a wind speed of approximately 12 m/s. If the torque increases beyond this threshold, for instance because of a gust acting for a short period of time upon the rotor blades 14, there is a risk of the gearbox 18 sustaining damage. By means of the turn drive according to the invention, it is ensured that the torque remains below this critical threshold at all times.

Figure 3:
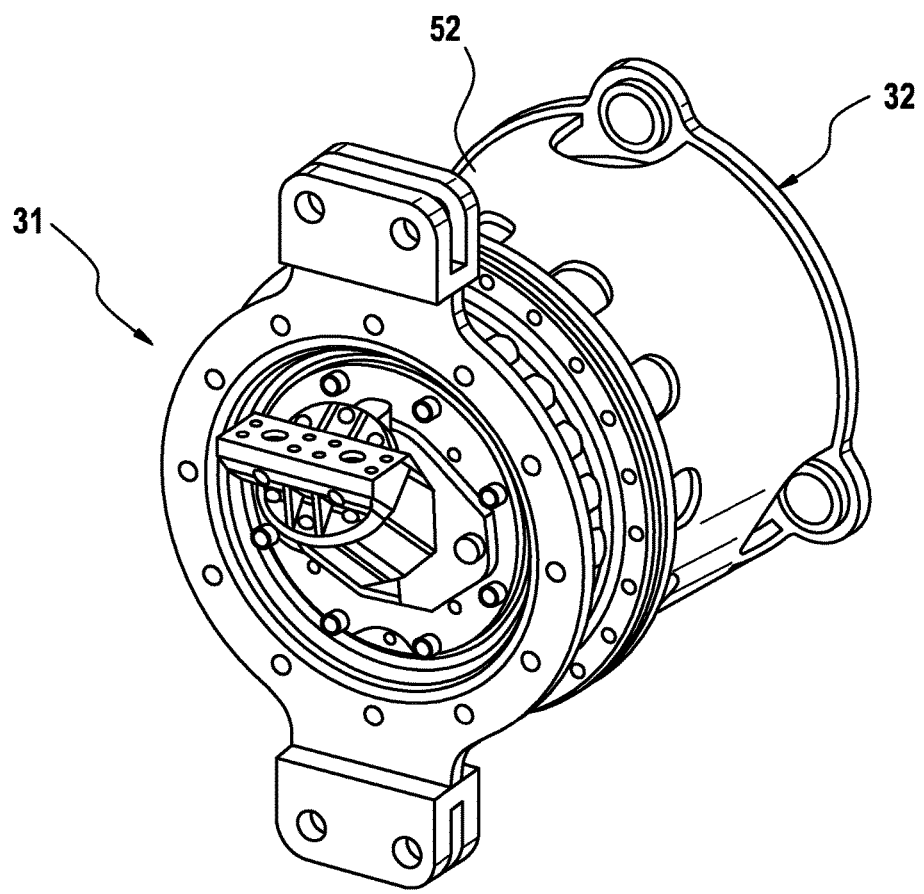
FIG. 3: a drive unit of a turn drive according to the invention.
Figure 4:
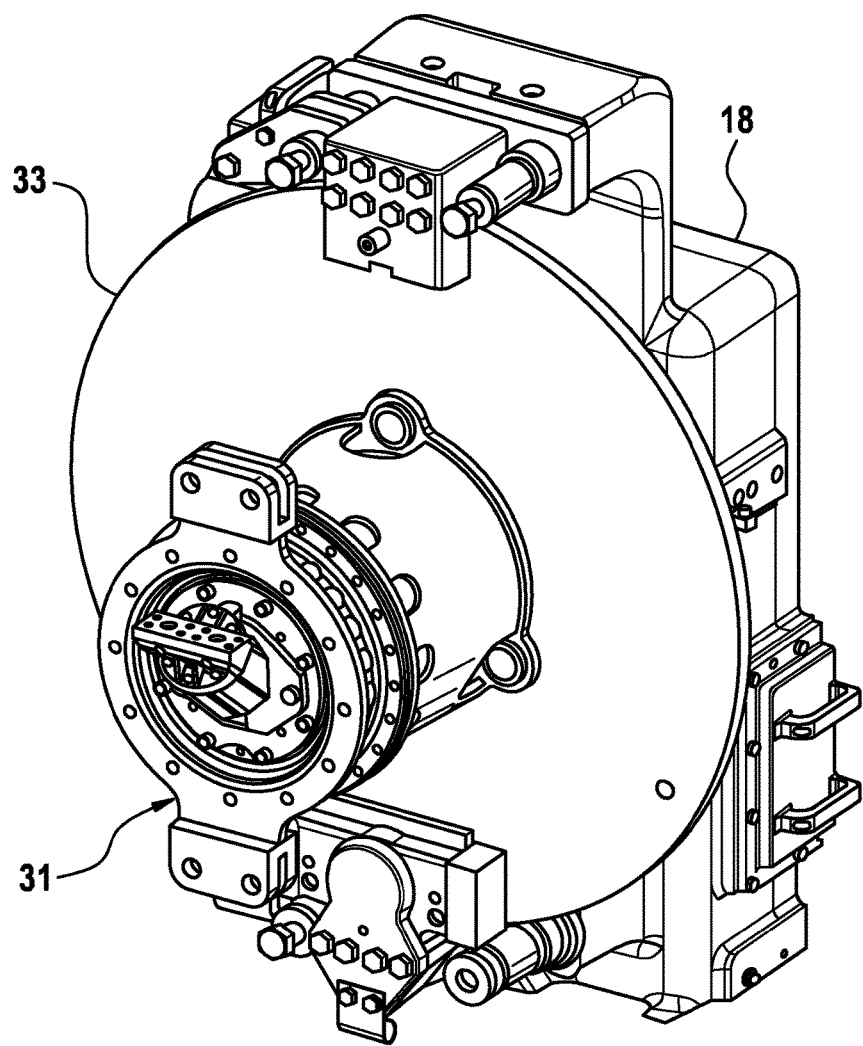
FIGS. 4 to 6: various stages in the connecting of the turn drive according to the invention to the high-speed shaft of the gearbox of a wind turbine.

The turn drive includes a drive unit 31, shown in FIG. 3, disposed inside which there is a hydraulic motor 27 and a multi-disk brake 28, neither of which are visible in FIG. 3. The drive unit 31 comprises a shaft 52, having a flange 32. Via the flange 32, the shaft 52 can be connected to a brake disk 33, which is seated on the high-speed gear shaft 19. FIG. 4 shows the state in which the drive unit 31 has been connected to the brake disk 33 of the wind turbine by means of three screws.

Figure 5:
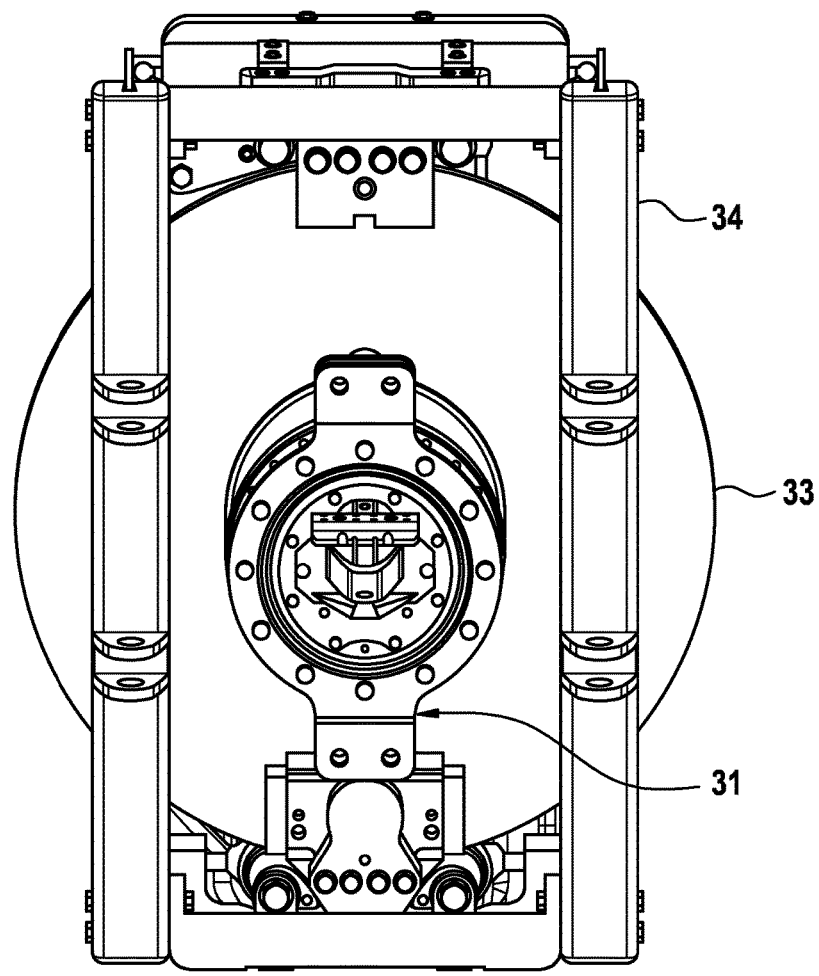
Figure 6:
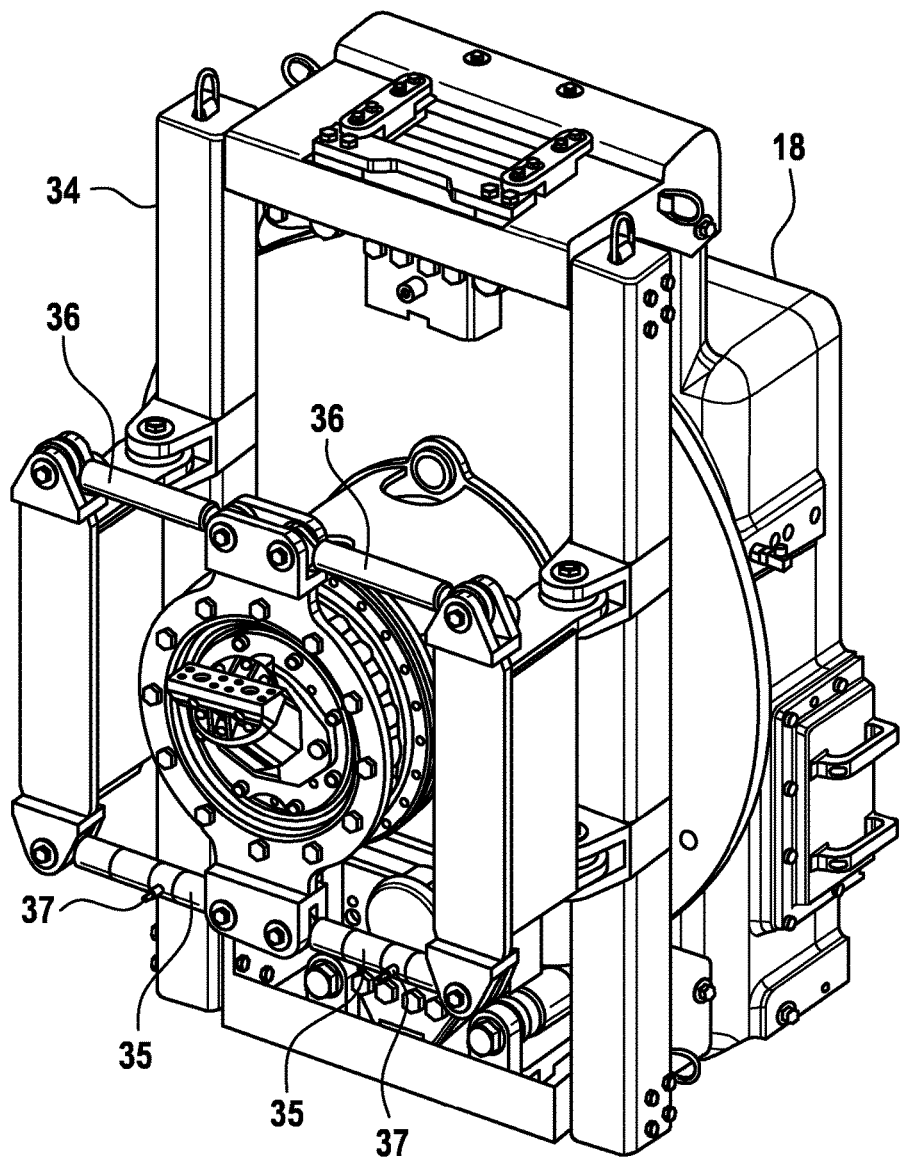

A support 34 is then screw-connected to the housing of the gearbox 18, see FIG. 5. The mechanical connection between the housing of the drive unit 31 and the support 34 is effected by means of four struts 35, 36, as shown in FIG. 6. The torque that is transmitted to the support 34 via the struts 35, 36 corresponds to the torque acting upon the high-speed gear shaft 19. The struts 35 are provided with torque sensors 37, by means of which this torque can be measured. In the struts 35, the forces are transmitted hydraulically. The torque sensors 35 determine the torque by measuring the pressure inside the struts 35. The struts 35 may be realized as jointed rods, such that transverse forces are avoided if the turn drive is not seated exactly concentrically on the brake disk.

Figure 7:
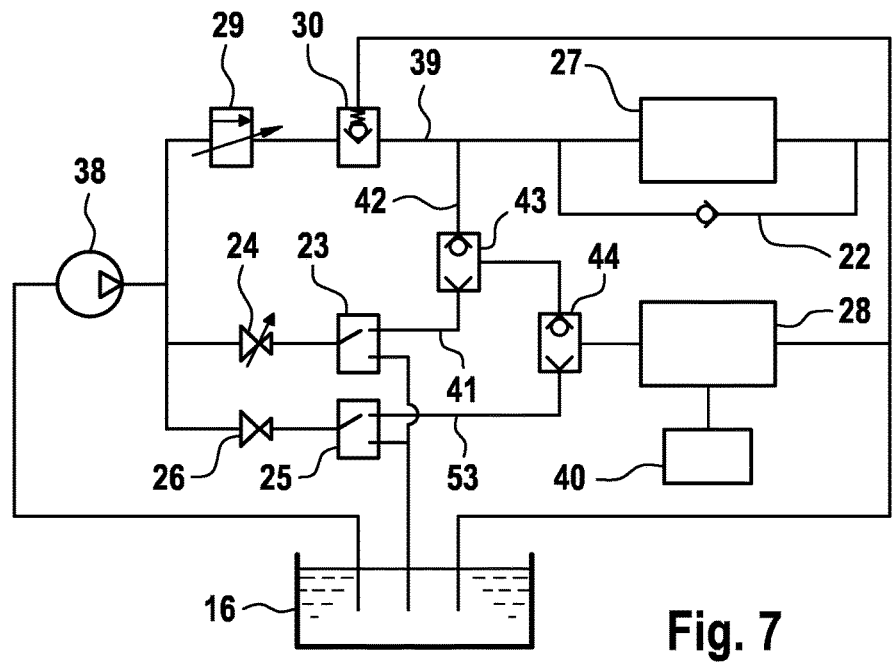
FIG. 7: a schematic representation of the principle of operation of the turn drive according to the invention.

According to the schematic representation of FIG. 7, the turn drive additionally comprises a hydraulic unit 38, which is designed to supply the drive unit 31 with pressurized hydraulic fluid from a reservoir 16. The hydraulic unit 38 may be a separate unit, which is connected to the drive unit 31 via hydraulic lines. From the hydraulic unit 38, the hydraulic fluid is routed through the drive line 39, via a proportional valve 29, to the hydraulic motor 27. The hydraulic fluid causes the shaft 52 of the drive unit 31 to rotate, the torque being substantially proportional to the pressure of the hydraulic fluid. The proportional valve 29 allows a continuous transition between a closed and an open state, such that the flow of hydraulic fluid in the direction of the hydraulic motor 27 can be set in a precise manner by means of the proportional valve 29. FIG. 7 shows only one drive line 39 having a proportional valve 29. In actual fact, the turn drive comprises a drive line 39 and a proportional valve 29 for each of the two directions of rotation.

When the shaft 52 rotates, the rotation is transmitted, via the brake disk 33 and the high-speed gear shaft 19, to the rotor shaft 17. In this way, the rotor 14, 15 can thus be brought into an angular position that is suitable for mounting a rotor blade 14.

In the present example, the torque applied to the high-speed gear shaft 19 by means of the drive unit 31 is not to exceed a threshold value of 60 kNm. Above this threshold value, there is a risk of the gearbox 18 sustaining damage. The hydraulic unit 38 is designed such that it can build up a pressure that corresponds to a torque of more than 60 kNm. The torque exerted upon the high-speed gear shaft 19 by the rotor 14, 15 may also be above the threshold value for a short period of time, for which reason the turn drive is equipped with means for limiting the torque.

In the turn drive according to the invention, a pressure-limiting valve 30 is provided in the drive line 39 that extends from the hydraulic unit 38 as far as the hydraulic motor 27. If the pressure in the drive line 39 increases to such an extent that the torque threshold value is exceeded, the pressure-limiting valve 30 opens, and some of the hydraulic fluid is routed back, past the hydraulic motor 27, into the reservoir 16. The pressure at which the pressure-limiting valve opens may be, for example, 200 bar. It is thereby ensured that the torque exerted by the hydraulic motor 27 does not at any point in time exceed the torque threshold value.

In a hydraulic motor 27, because of its design, there is a leakage flow, such that the hydraulic motor 27 is unsuitable for locking the rotor 14, 15 in a position. The drive unit 31 is therefore additionally equipped with a brake, which, in the present example, is realized as a multi-disk brake 40. The multi-disk brake 40 is actuated by means of a hydraulic actuating element 28, and comprises an element connected to the shaft 52, and an element connected to the housing of the drive unit 31, between which there is a friction when the multi-disk brake is in engagement. Once the multi-disk brake 40 has been released, the two elements can rotate relative to each other. When the actuating element 28 is pressurized, the multi-disk brake 40 is released, and when unpressurized the multi-disk brake 40 is in engagement.

By means of the multi-disk brake 40, the rotor 14, 15 can be arrested in any angular position. The multi-disk brake 40 is likewise designed such that it can apply to the high-speed gear shaft 19 a torque that is above the threshold value. Limitation of the torque is achieved in that a settable pressure reducer 24 is disposed in the brake line 41 that extends from the hydraulic unit 38 as far as the actuating element 28. The pressure reducer 24 is set such that the slip moment of the multi-disk brake 40 corresponds to the torque threshold value. For example, the pressure reducer 24 may be set to 12 bar. It is thereby ensured that the gearbox 18 cannot be overloaded by the multi-disk brake 40.

Both the hydraulic motor 27 and the multi-disk brake 40 are of themselves limited to the torque threshold value that can be withstood by the gearbox. In addition, it must be ensured that the torque from the hydraulic motor 27 and the multi-disk brake 40 cannot be added together. For this purpose, the turn drive according to the invention is equipped with a connecting line 42, which extends between the hydraulic motor 27 and the multi-disk brake 40. The connecting line 42 and the brake line 41 are connected to each other via a shuttle valve 43, such that the higher of the two pressures acts upon the actuating element 28.

For the purpose of illustration, a state is to be assumed in which, by means of the multi-disk brake 40, the rotor is held in a particular angular position, from which the rotor 14, 15 is to be brought into a different angular position by means of the hydraulic motor 27. The proportional valve 29 is then opened slowly, in order to supply hydraulic fluid to the hydraulic motor 27. As soon as the pressure in the drive line 39 is greater than the pressure in the brake line 41, and the hydraulic motor 27 thus begins to build up its torque, the pressure from the drive line 39 acts upon the actuating element 28, via the shuttle valve 43 and the connecting line 42. In the same proportion as the torque of the hydraulic motor 27 is built up, the slip moment of the multi-disk brake 40 is reduced, such that the torque threshold value is maintained in total. The converse applies when the rotor 14, 15 has been brought into the desired angular position by means of the hydraulic motor 27, and the rotor 14, 15 is then to be held in this angular position by means of the multi-disk brake 40.

Slipping constitutes a considerable load on the multi-disk brake 40, which can be withstood by the multi-disk brake 40 only for a limited period of time, for example 2 minutes. Therefore an auxiliary brake line 53 is provided, by means of which hydraulic fluid can be supplied to the actuating element 28, bypassing the pressure reducer 24. The auxiliary brake line 53 is coupled to the brake line 41 via a shuttle valve 44, such that the higher of the two pressures acts upon the actuating element 28. In this way, the multi-disk brake 40 is released in a constrained manner if the maximum slip time period has been attained. For this purpose, the turn drive comprises a controller 45, not represented in FIG. 7, which actuates the directional valve 25 accordingly.

Simultaneously with the release of the multi-disk brake 40, the controller 45 sets the proportional valve 29 such that the hydraulic motor 27 applies an opposing torque to the high-speed gear shaft 19. The torque of the hydraulic motor 27 is increased continuously until it corresponds to the torque threshold value. If necessary, the partial rotor 14, 15 can rotate in this state, without damage being sustained by the turn drive, until, for example, the one rotor blade 14, or the two rotor blades 14, points or point downward.

Before the rotor 14, 15 is put into rotation by means of the turn drive, a gearbox preparation phase is implemented. For this, the rotor shaft 17 is rotated by five full revolutions within 25 minutes, by means of an internal drive. The pump by which the gear oil is circulated is in operation in this phase, such that gear oil is kept in motion and heats up.

In this phase, the turn drive according to the invention is to rotate concomitantly with as little resistance as possible. For this purpose, the drive unit 31 comprises a short-circuited line 22, such that the hydraulic motor 27 can convey the hydraulic fluid in a direct circuit. In addition, the actuating element 28 is pressurized via the auxiliary brake line 53, such that the multi-disk brake 40 is released fully.

Following the gearbox preparation phase, the use of the turn drive according to the invention can begin. The controller 45 first gives a control command to the directional valve 25 to interrupt the auxiliary brake line 53. The actuating element 28 is thereby switched to a pressureless state, and the multi-disk brake 40 engages. Next, a control command goes to the directional valve 23, to connect the brake line 41. Via the shuttle valves 43, 44, the pressure from the brake line 41 acts upon the actuating element 28. In the next step, the settable pressure reducer 24 is adjusted such that the slip moment of the multi-disk brake 40 corresponds to the torque threshold value that is the maximum allowable load on the gearbox 18.

The actual operation of the turn drive commences, in that the proportional valve 29 is opened slowly under the control of the controller 45. The pressure in the drive line 39 increases, and the hydraulic motor 27 begins to build up a torque. In parallel with this, the pressure from the drive line 39 acts upon the actuating element 28, via the shuttle valves 43, 44, such that the slip moment of the multi-disk brake 40 reduces continuously. The sum of the torque of the hydraulic motor 27 and the torque (slip moment) of the multi-disk brake 40 is always less than the torque threshold value. As soon as there is a sufficient pressure present in the drive line 39, the multi-disk brake 40 is released completely, and only the torque of the hydraulic motor 27 acts upon the high-speed gear shaft 19. The turn drive remains in this operating state until the rotor 14, 15 has rotated into the desired angular position. If, for example, the high-speed gear shaft 19 rotates at 2 rpm, it takes approximately 15 minutes to rotate the rotor shaft by 120°. Once the rotor 14, 15 has reached the desired angular position, the proportional valve 29 is closed, and the multi-disk brake 40 again acts with the set slip moment upon the high-speed gear shaft 19.

The rotor shaft 17 is locked in this position by means of the locking device 20, such that the gearbox 18 is free of load. Once the rotor shaft 17 has been locked, the multi-disk brake 40 can be released fully. The rotor shaft 17 remains locked during the mounting of the rotor blade 14.

Figure 8:
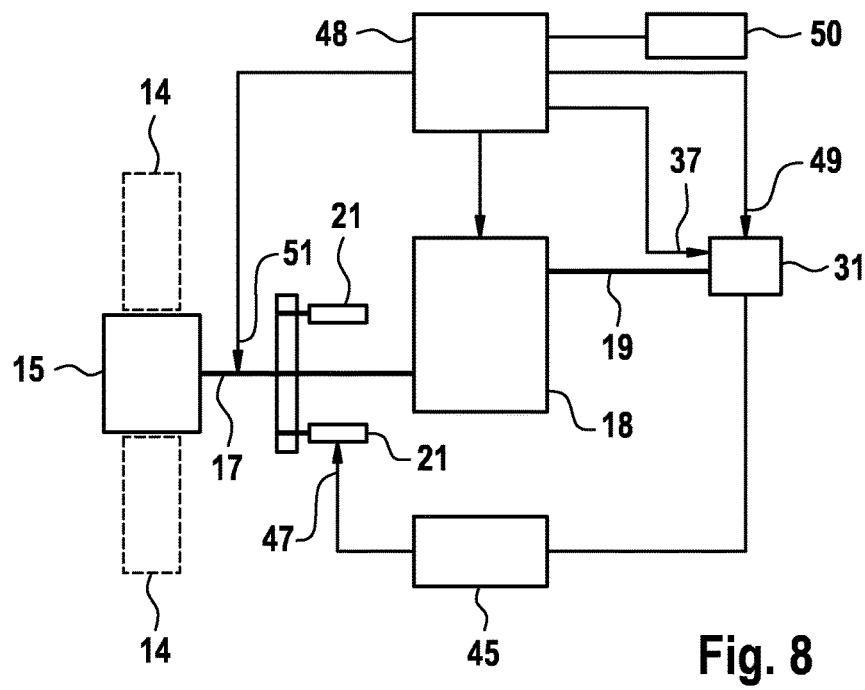
FIG. 8: a schematic representation of a data logger of the turn drive according to the invention.

Following the mounting of the rotor blade 14, the locking device 20 is under great load. The locking device 20 must first be relieved of load, by means of the turn drive, before the locking device can be released. Under the control of the controller 45, the proportional valve 29 responsible for the respective direction of rotation is opened slowly, such that the rotor shaft 17 rotates against the weight of the rotor blade 14. According to FIG. 8, the locking device 20 comprises a sensor 47 for the load state of the pins 21. The signal from the sensor 47 is supplied to the controller 45, via an associated signal input. The controller 45 stops the hydraulic motor 27 as soon as the pins 21 are free of load, and brings the multi-disk brake 40 into engagement, with the set slip moment. The locking device 20 can now be unlocked by an operator. If a gust occurs in this phase, the torque acting upon the rotor shaft 17 may increase beyond the slip moment, and the rotor shaft 17 starts to rotate. This can result in damage to the locking device 20, which damage is accepted, to protect the gearbox 18.

Following the unlocking of the locking device 20, the hydraulic motor 27 is put into operation in the opposite direction, in order to rotate the rotor shaft 17 by 120°, such that the next rotor blade 14 can be mounted. The described sequence is repeated over again, until all three rotor blades 14 have been mounted.

It may be the case that a pause is required between the mounting of two rotor blades 14, for example because of the onset of night, or because of deteriorating weather conditions. In this case, the wind turbine is brought into a rest state, in which the partial rotor 14, 15 is in a stable equilibrium. In the case of a partial rotor 14, 15 having one rotor blade 14, this means that the rotor blade 14 points vertically downward. In the case of a partial rotor 14, 15 having two rotor blades 14, the two rotor blades 14 each enclose an angle of 60° with the downward vertical. If required, the wind turbine can also remain in the rest state for a relatively long period of time.

The time interval until the mounting of the next rotor blade 14 usually lasts until the gearbox 18 has cooled down completely again. A new gearbox preparation phase is thus required before the gearbox 18 is subjected to large torques. For this, the partial rotor 14, 15 is first rotated by a predefined angle, for example 10°, against the actual direction of rotation, by means of the turn drive. The direction of rotation is then reversed, and the partial rotor 14, 15 is rotated to such an extent that the blade connection for mounting the next rotor blade 14 comes into the 9-o'clock position. Since the partial rotor 14, 15 is rotated first by 10° in the one direction, then back to the 0° position, and then again by 10° in the other direction, in total there is a rotation of 30°, in which the gearbox 18 is subjected only to small loads. This is sufficient to heat the gear oil and to make the gearbox 18 ready for operation. The majority of the rotation for reaching the 9-o'clock position is then performed with gear oil that has already been pre-heated.

For the purpose of documentation, the turn drive comprises a data logger 48 that, during the mounting of the rotor blades 14, records various data that make it possible to deduce the loads to which the gearbox 18 was subjected. It may suffice if the data are recorded only in the phases in which the turn drive is in operation and the locking device 20 has been released. For comprehensive documentation, however, it is better if the data are recorded throughout the entire operation of mounting the rotor blades 14.

The data logger 48 is first connected between the torque sensor 37, which measures the torque transmitted between the drive unit 31 and the support 34. In addition, the data logger 48 is connected to a pressure sensor 49, which measures the pressure of the hydraulic fluid in the hydraulic motor 27. Since this pressure is substantially proportional to the torque applied by the hydraulic motor 27, the load on the gearbox 18 can be deduced directly from the pressure. Also recorded is the information relating to the wind speed and wind direction, measured by means of an anemometer 50. The angular position of the rotor shaft 17 is recorded by means of a further sensor 51. The sum of this data constitutes comprehensive documentation concerning the loads to which the gearbox 18 was subjected during the mounting of the rotor blades.

The invention claimed is:

1. A turn drive for a wind turbine, comprising a shaft (52), a hydraulic motor (27) for driving the shaft (52), a torque sensor (37) for the torque transmitted between a drive unit (31) of the turn drive and a support (34), and a drive line (39) for supplying a pressurized hydraulic fluid to the hydraulic motor (27), wherein the turn drive is configured for connection to a high-speed shaft (19) of a gearbox (18) of the wind turbine and the drive line (39) is provided with a settable pressure-limiting valve (30).

2. The turn drive of claim 1, wherein a mechanical brake (40) is provided for the shaft.

3. The turn drive of claim 2, the brake (40) has a hydraulic actuating element (28), wherein a brake line (41) carrying hydraulic fluid is connected to the actuating element (28), and wherein the brake (40) is released when the hydraulic fluid is pressurized.

4. The turn drive of claim 3, which comprises a pressure accumulator for the pressure in the brake line (41).

5. The turn drive of claim 3, wherein a settable pressure reducer (24) is disposed in the brake line (41).

6. The turn drive of claim 5, wherein an auxiliary brake line (53) extends to the actuating element (28), in order to supply hydraulic fluid to the actuating element (28), bypassing the settable pressure reducer (24).

7. The turn drive of claim 6, which comprises a pressure accumulator for the pressure in the auxiliary brake line (53).

8. The turn drive of claim 2, wherein there is a connecting line (42) between the hydraulic motor (27) and the brake (40).

9. The turn drive of claim 8, wherein the connecting line (42) and the brake line (41) are connected to each other via a shuttle valve (43), such that the higher of the two pressures acts upon the actuating element (28).

10. The turn drive of claim 1, wherein the hydraulic motor (27) is equipped with a short-circuited line (22).

11. The turn drive of claim 1, which comprises a controller (45), having a signal input for a signal relating to the state of a locking device (20) of a rotor shaft (17) of the wind turbine.

12. The turn drive of claim 1, wherein a data logger (48) is provided, which, when the turn drive is in operation, records one or more of the following items of information:
   a. pressure of the hydraulic fluid in the hydraulic motor (27);
   b. torque between the hydraulic motor (27) and a support (34);
   c. oil temperature of the gearbox (18) of the wind turbine;
   d. wind speed and wind direction;
   e. angular position of a rotor shaft (17) of the wind turbine.

13. An arrangement of a gearbox of a wind turbine and a turn drive of claim 1, wherein the shaft (52) of the turn drive is in engagement with the high-speed shaft (19) of the gearbox (18).

14. The arrangement of claim 13, wherein the shaft (52) of the turn drive is aligned concentrically in relation to the high-speed shaft (19).

15. A method for rotating a rotor shaft (17) of a wind turbine, wherein the rotor shaft (17) is connected to a gearbox (18) of the wind turbine, having the following steps:
   a. connecting a turn drive to a high-speed shaft (19) of the gearbox (18), wherein the turn drive is equipped with a hydraulic motor (27) and a torque sensor (37) for the torque transmitted between a drive unit (31) of the turn drive and a support (34);
   b. setting a pressure-limiting valve (30) in a drive line (39) of the hydraulic motor (27) to a predefined threshold value, in order to limit the torque that can be transmitted to the gearbox (18);
   c. supplying a pressurized hydraulic fluid to the hydraulic motor (27), wherein the pressure-limiting valve (30) opens when the pressure of the hydraulic fluid exceeds the predefined threshold value.

16. A turn drive for a wind turbine, comprising a shaft (52), a hydraulic motor (27) for driving the shaft (52), a mechanical brake (40) provided for the shaft (52), and a drive line (39) for supplying a pressurized hydraulic fluid to the hydraulic motor (27), wherein there is a connecting line (42) between the hydraulic motor (27) and the brake (40) and the drive line (39) is provided with a settable pressure-limiting valve (30).

* * * * *